May 7, 1963     R. A. MATHEISEL     3,088,696
POWER SUPPLY AUXILIARY

Filed Dec. 27, 1957     5 Sheets-Sheet 1

INVENTOR
RUDOLPH A. MATHEISEL
BY
Julian C. Renfro
ATTORNEY

May 7, 1963  R. A. MATHEISEL  3,088,696
POWER SUPPLY AUXILIARY

Filed Dec. 27, 1957  5 Sheets-Sheet 2

INVENTOR
RUDOLPH A. MATHEISEL
BY *Julian C. Renfro*
ATTORNEY

May 7, 1963

R. A. MATHEISEL 3,088,696

POWER SUPPLY AUXILIARY

Filed Dec. 27, 1957

INVENTOR
RUDOLPH A. MATHEISEL

BY Julian C. Renfro
ATTORNEY

May 7, 1963  R. A. MATHEISEL  3,088,696
POWER SUPPLY AUXILIARY
Filed Dec. 27, 1957  5 Sheets-Sheet 5

INVENTOR
RUDOLPH A. MATHEISEL
BY
Julian C. Renfro
ATTORNEY

3,088,696
POWER SUPPLY AUXILIARY
Rudolph A. Matheisel, Baltimore, Md.
Filed Dec. 27, 1957, Ser. No. 722,111
8 Claims. (Cl. 244—14)
(Filed under Rule 47(b) and 35 U.S.C. 118)

The present invention relates to an improved electric and hydraulic power supply auxiliary system for the control equipment of an airborne guided missile, and more particularly to such a system which is compact and lightweight.

The electric and hydraulic power required to actuate the guidance system and aerodynamic control surfaces of a guided missile are usually provided by means of a power supply auxiliary, and not by the missile propulsion motor. An example of such a power supply auxiliary is described in Patent No. 2,723,528, issued November 15, 1955, to S. Stark et al., assigned to the assignee of this application, and entitled "Auxiliary Power Package." That patent discloses a power supply auxiliary wherein a solid propellant charge, of the type commonly used for rocket propulsion, is continuously burned to produce a gas at a highly regulated pressure. The pressurized gas thus produced is employed to drive a turbine which in turn drives an alternator for generating the required electrical energy. The gas is also employed to pressurize an hydraulic reservoir which provides the required hydraulic power.

The power supply disclosed in the Stark patent has proven to be adequate for a missile for relatively short flight duration, for example a missile of the air-to-air type. With a missile of longer flight duration, however, the volume and weight of solid propellant charge required by the Stark gas generator becomes so large as to conflict with the aerodynamic design requirements of the missile.

It is one of the objects of the present invention to provide a power supply auxiliary adapted for use in a relatively long flight duration missile. To this end a pressurized gas generator is provided which is both compact and lightweight, consistent with the aerodynamic design requirements of the missile.

In providing such a gas generator the present invention recognizes that a large portion of the solid propellant charge employed by the prior Stark patent generator is utilized in the production of large amounts of unneeded gas. This is due to the fact that a burning propellant charge generates gas continuously regardless of the requirements of the missile control equipment. As a result there is an excess accumulation of gas which is required to be exhausted into the atmosphere with attendant loss.

Accordingly, the improved generator of the invention is adapted to effect a conversion into gas of working increments of the propellant charge, only as required for the operation of the missile control equipment. To this end the generator employs a plurality of explosive charge units arranged to expel gas into a storage vessel only when triggered. The pressurized gas thus produced is employed to operate the hydraulic and electrical drive units of the power supply. A demand valve is provided between the gas generator and drive units so that depletion of the gas supply takes place only when required by the missile equipment. In accordance with the working increment principle the gas generator is adapted to explode a charge unit whenever the gas supply within the storage vessel is depleted to a predetermined working pressure minimum. This is effected by means of a gage adapted to measure the gas pressure within the storage vessel and to produce a command signal whenever the gas pressure therewithin decreases to the predetermined minimum. Trigger means responsive to such a command signal is then provided for exploding the charge units. The trigger means is adapted to fire a charge unit in response to each command signal and to fire the plurality of charge units in a predetermined order. In this way the gas pressure within the storage vessel is always maintained at sufficient pressure to operate the missile control equipment while the bulk of the required propellant charge is held to a minimum.

The invention also provides an alternative compact and lightweight pressurized gas generator for the operation of the hydraulic and electrical drive units of the power supply. This alternative generator is adapted to produce pressurized gas by the use of energy derived from the propulsion motor of the guided missile. Such a propulsion motor is conventionally of the reaction type ejecting an elastic fluid from a generation chamber at some predetermined pressure and temperature. Heretofore the use of such energy has been neglected due to the fact that a missile reaction motor normally cuts off from operation prior to the termination of the missile flight, while the power supply auxiliary must ordinarily provide a continuously available supply of energy throughout the duration of the missile flight.

It is therefore another object of the invention to provide in a power supply auxiliary for a relatively long flight duration missile, a lightweight and compact gas generator which employs energy from a missile reaction motor to produce pressurized gas not only while the reaction motor is operative but also during the interval of time between motor "burn out" and target-strike by the missile.

To this end the improved gas generator comprises a conduit means connected to bleed pressurized gas from the reaction motor of the missile. The bled gas is not at a pressure high enough to operate the electrical and hydraulic drive units of the power supply. For this reason the invention provides a compressor engine adapted to raise the pressure of the bled gas up to a predetermined higher value. The compressor engine has a first and second inlet port connected to the conduit means respectively, and an outlet port. The engine is adapted to be operated by the pressurized elastic fluid entering the first inlet port and to compress pressurized elastic fluid entering the second inlet port to the predetermined higher pressure at the outlet port. To provide a continuously available supply of this pressurized gas for the operation of the drive units of the power supply, the invention provides a gas accumulator adapted to store pressurized elastic fluid therewithin. The outlet port of the compressor engine is then connected to the accumulator by conduit means so that the pressurized gas compressed by the engine is conducted to the accumulator for storage. Demand valve means are connected between the accumulator and the drive units of the power supply so that a depletion from the accumulator will occur only when gas is required for the operation of the drive units. Thus, by making the accumulator tank large enough to store a quantity of gas sufficient to operate the missile control equipment from motor burn out to target-strike the improved gas generator provides pressurized gas throughout the flight time of the missile.

The gas generator embodiment above described is limited to use in guided missiles employing propulsion motors of the pressurized elastic fluid, reaction type. Otherwise it may be used interchangeably with the first described embodiment to operate the electrical and hydraulic drive units of the power supply.

An additional factor making the power supply disclosed in the Stark patent unsatisfactory for long-range missiles is the large weight and size of the hydraulic reservoir employed. It is another object of the invention to provide in a power supply auxiliary for a relatively long flight duration missile, an improved unit for the production of hydraulic power which is materially reduced in weight and size in comparison with the pressurized hydraulic reservoirs heretofore employed.

In providing such a unit the invention recognizes that pressurization of the entire required hydraulic fluid volume is unnecessary and adds considerably to the bulk of the hydraulic unit. Accordingly, the improved unit of the invention is adapted to pressurize working increments of hydraulic fluid, only as required for the operation of the missile control equipment.

To this end the improved unit comprises a reservoir of hydraulic fluid which is ordinarily at atmospheric pressure. The output of this reservoir is connected through a fluid injector into a demand vessel. The fluid injector is operated by the pressurized gas from the gas generator and adapted to pump increments of hydraulic fluid from the reservoir into the demand vessel. The demand vessel is adapted to maintain the fluid therewithin above a predetermined minimum pressure. The output of the demand vessel is then connected through demand valve means to an actuator unit operable by hydraulic fluid and adapted to operate the missile control equipment.

In this way, hydraulic fluid is depleted from the demand vessel only when required by the actuator unit. In addition, only a small working increment of the total hydraulic fluid volume within the reservoir is pressurized to maintain the pressure within the demand vessel above the predetermined minimum. Individual components such as pressurizing cylinders and pistons of large physical dimensions and heavy weight may be therefore replaced by relatively small components performing an equivalent function.

The invention can be best understood by referring to the following drawings in which.

Figure 1:
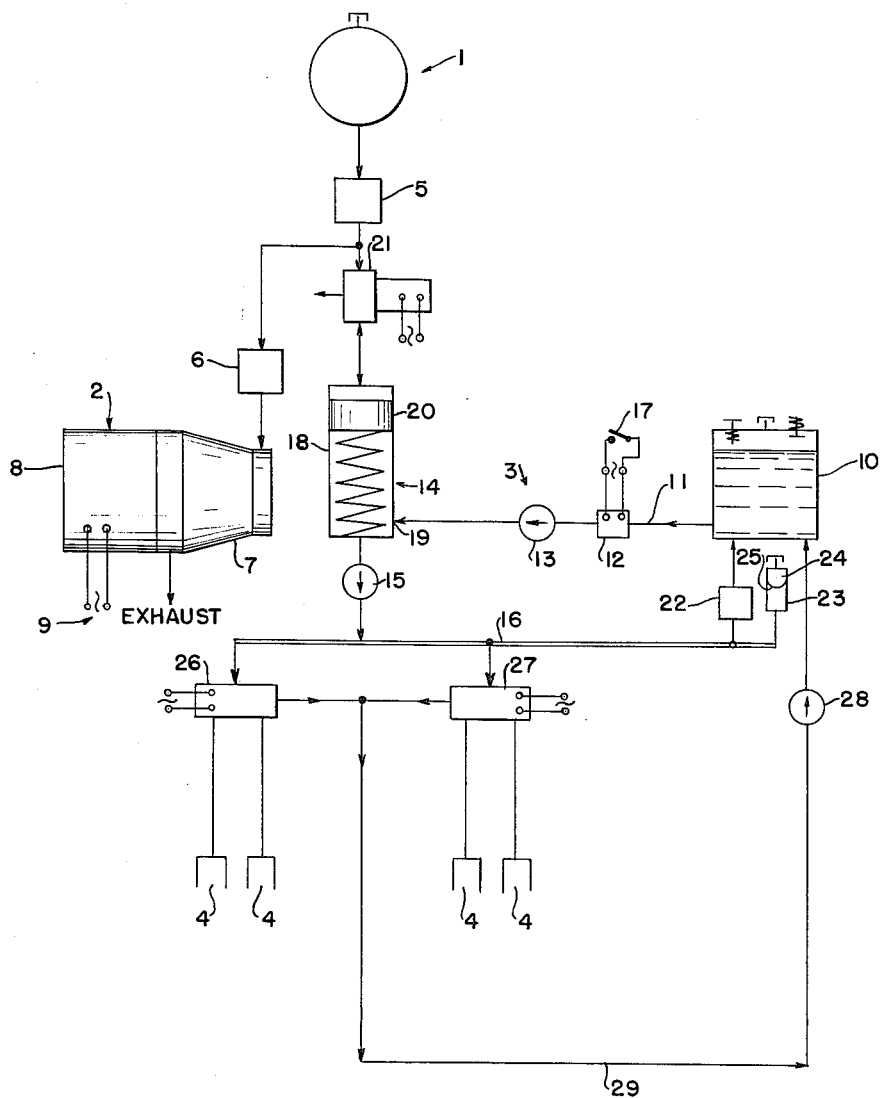
FIG. 1 is a schematic diagram of a power supply auxiliary in accordance with the invention.

Referring to FIG. 1 the power supply auxiliary basically includes a gas generator 1 operating an electrical unit 2 and an hydraulic unit 3. Although in the illustrated embodiment the electrical unit and hydraulic unit are operated in parallel, series operation is also within the contemplation of the invention and may be preferable in some instances. The electrical unit 2 is employed to produce electrical power for the operation of the electronic guidance system of the missile. The hydraulic unit 3 is employed to operate hydraulically motivated actuator pistons 4 which operate the aerodynamic control surfaces of the guided missile.

The pressurized gas from gas generator 1 provides the energy for the actuation of the electrical and hydraulic drive units of the power supply auxiliary. The gas generator output may have to be reduced to a lower pressure prior to its introduction to the hydraulic and electrical units. This may be effected by means of conventional pressure reducers 5 and 6. Normally the gas pressure required for the operation of the electrical unit is less than that required for the operation of the hydraulic unit. For this reason the gas conducted to the electrical unit 2 passes through both pressure reducers connected in series, while the gas transmitted to the hydraulic unit 3 passes only through pressure reducer 5.

The electrical unit 2 preferably comprises a turbo alternator of an appropriate type. The pressure-reduced gas is then conducted into the turbine portion of the electrical unit where the energy is utilized to drive the rotor of the alternator portion 8, and to produce an electrical voltage output across terminals 9.

The hydraulic unit 3 of the power supply comprises an hydraulic fluid reservoir 10 which is normally at atmospheric pressure. A conduit means 11 is connected from the reservoir 10 through an initiating valve 12 and a check valve 13 to a fluid injector 14 which is adapted to pump increments of fluid from the reservoir through a check valve 15 into a demand vessel 16. The initiating valve 12 is adapted to open the conduit 11 to the passage of hydraulic fluid from the reservoir 10 at missile launch. This may be effected by means of an electrical signal through switch 17 indicating that the missile has been launched. Both check valves 13 and 15 are of the type which permit fluid flow in one direction only, as indicated by the arrows. The fluid injector 14 comprises a cylinder 18 having an inlet port 19 for the entry of hydraulic fluid from the reservoir 10. A spring-loaded piston 20 is employed to force the fluid entering the injector through the check valve 15 into the demand vessel 16. The piston 20 of the injector is operated by the pressurized gas from gas generator 1. This gas passes through a demand valve 21 before being introduced into the fluid injector.

The demand vessel 16 comprises a fluid line having two branches. One of the branches passes through a relief valve 22 back into the fluid reservoir 10. This relief valve tributary is included to pass any excess hydraulic fluid back into the reservoir. The other branch terminates in a capped tubular riser 23. The riser is in effect a miniature accumulator whose capacity or value is essentially that of the line. The riser contains an elastic fluid charge 24 which is separated from the hydraulic fluid in the demand vessel 16 by means of a diaphragm 25. The riser is employed to maintain the pressure on the hydraulic fluid within the demand vessel above a predetermined minimum. This is done by means of the pressurized elastic fluid 24 which maintains a compressive force on the hydraulic fluid through the diaphragm 25.

The hydraulic fluid in the demand vessel 16 is connected through control demand valves 26 and 27 to drive the hydraulically operated pistons 4 of the actuator unit which is employed to power the aerodynamic control surfaces of the missile. The demand valves 26 and 27 are adapted to pass fluid to the pistons 4 of the actuator unit only when actuation of the missile control surfaces is required. This is effected by means of electrical signals derived from the guidance system of the missile. Exhaust hydraulic fluid from the actuator unit is returned to the reservoir through a check valve 28 by means of a fluid return line 29.

In operation the initiating valve 12 opens conduit 11, whereupon fluid flows from the fluid reservoir 10 into the injector 14. When the guidance system indicates the need for actuation of the missile control surfaces, a command signal is sent to the control demand valves 26 and 27 and the demand valve 21. The demand valve 21 then permits pressurized gas to enter the fluid injector 14 and drive the piston 20 against the force of the spring, whereupon fluid is driven past the check valve 15 into the demand vessel 16. Upon the completion of the pulse stroke the spring returns the piston to its initial position. Fluid from reservoir 10 is thus forced into the injector by the vacuum created, in readiness for the next pumping stroke of the injector. On the other hand, compressed fluid forced into the demand vessel 16 is prevented from returning to the injector by check valve 15.

The command signal which initiates the pumping stroke of fluid injector 14 also opens the demand valves 26 and 27. This permits hydraulic fluid to flow therethrough and to operate the pistons 4 of the actuator unit. The riser 23 by its action maintains a predetermined working pressure on the hydraulic fluid within the demand vessel between the pumping strokes of the fluid injector. Thus the hydraulic fluid is always sufficiently energized to operate the actuator unit. To this end, in the illustrated embodiment, the displacement of the fluid injector and capacity of the demand vessel should exceed the fluid demand of the actuator between pumping strokes.

The above-described hydraulic unit efficiently operates the missile actuator units while pressurizing only working increments of hydraulic fluid rather than the total fluid volume within the reservoir. In this way the pressurizing components may be materially reduced in size and weight and the total hydraulic unit made compact and lightweight in accordance with aerodynamic design requirements.

A preferred embodiment of the hydraulic unit has been described. Other alternatives may be employed which are within the scope of the invention. For example, the riser 23 may be entirely eliminated if a compounded inelastic fluid, such as silicones, is employed. Such a fluid is compressible to a degree and will therefore pressurize itself within the demand vessel. Where the term "substantially inelastic fluid" is employed in the specification and appended claims, it is intended to include within its meaning conventional hydraulic fluids and the compounded inelastic fluids above described.

Another possible alternative is the replacement of the demand valve 21 and fluid injector 14 by a high-speed ball pump driven by the turbine portion 7 of the electrical unit 2. In addition, the gas out of generator 1 may advantageously be tapped prior to flowing into the injector 14 to be cooled by passing through coils immersed in the fluid within the reservoir 10.

Figure 2:
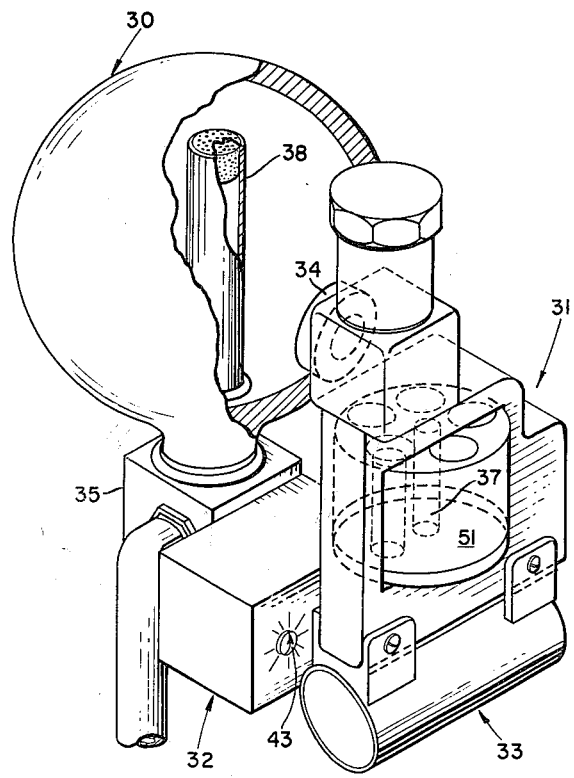
FIG. 2 is a perspective view of one preferred embodiment of the gas generator employed in FIG. 1.
Figure 3:
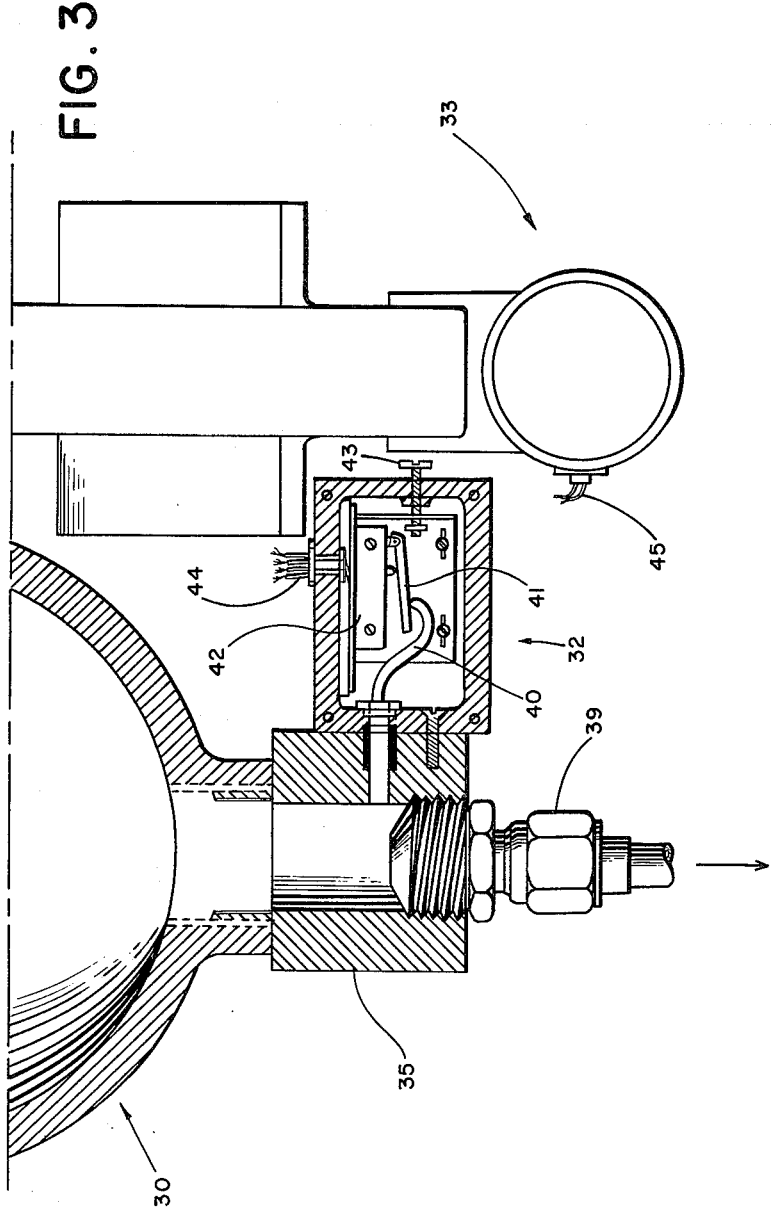
FIG. 3 is a sectional view taken through a lower portion of FIG. 2 and illustrating the pressure gage employed therein.
Figure 4:
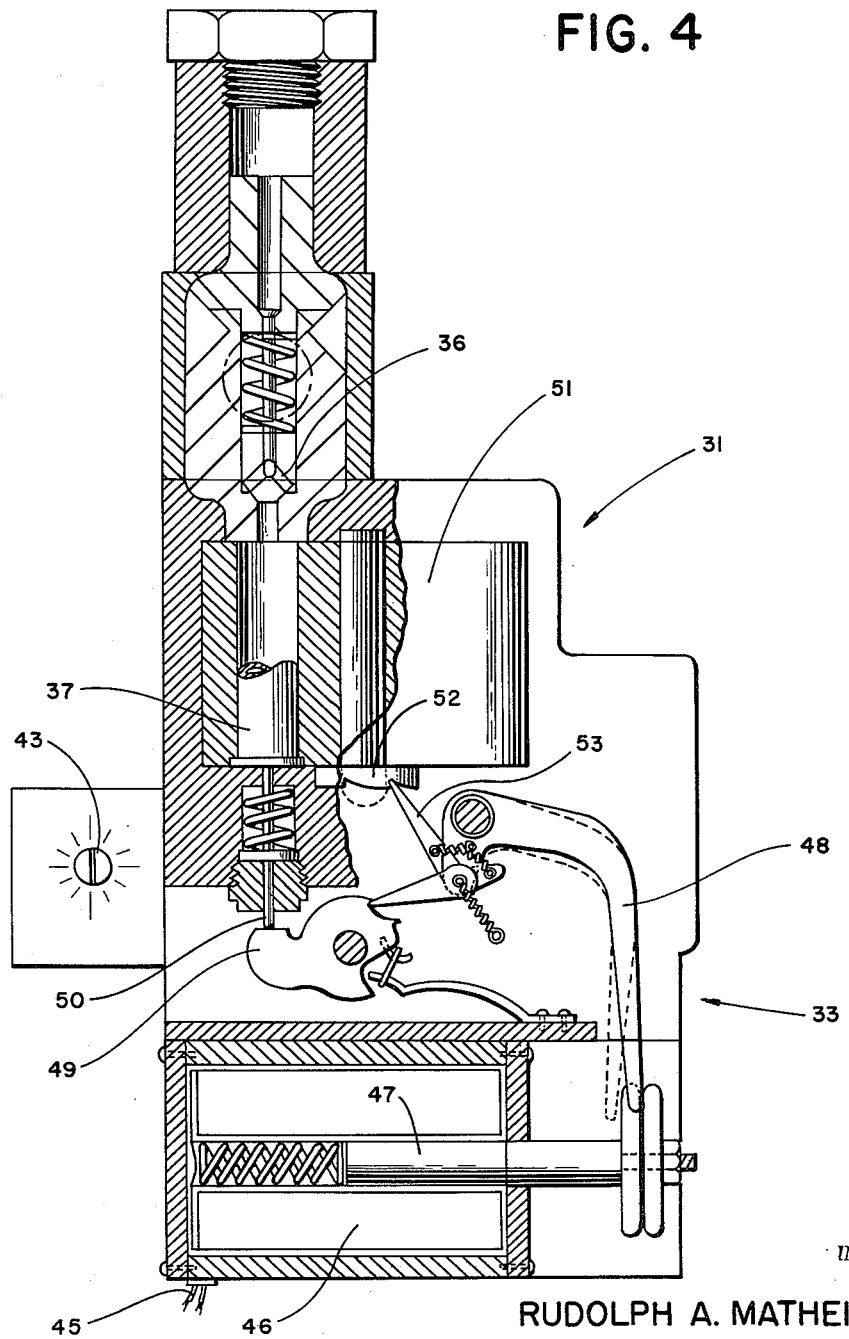
FIG. 4 is a sectional view taken through a central portion of FIG. 2 and illustrating the trigger means employed therein.

While any suitable gas generator may be employed with the electrical and hydraulic units as illustrated in FIG. 1, the invention provides two preferred embodiments which contribute to the compactness and light weight of the total power supply auxiliary. One of these embodiments is illustrated in FIGS. 2, 3, and 4 and employs the working increment on demand principle to effect economy of space and weight.

The gas generator basically comprises a storage vessel 30 for pressurized gas, a revolver arrangement 31 adapted to fire cartridges of gas producing explosive charges into the storage vessel 30, a pressure gage 32 (FIG. 3) for determining the gas pressure within the storage vessel 30 and adapted to produce a command signal when the pressure decreases to a predetermined minimum, and triggering means 33 (FIG. 4) adapted to explode one of the charge units in response to a command signal from the pressure gage 32 and to explode the plurality of charge units in a predetermined order. In this way the gas is stored in compact charge form and exploded into the miniaturized storage vessel when necessary to maintain the pressure within the storage vessel at its operating value.

More particularly, the storage vessel 30 has an inlet fitting 34 and an outlet fitting 35. The cartridge-containing chamber 31 is affixed to the inlet fitting 34 and provided with a check valve 36 spring biased so that it normally blocks the passage of gas from the storage vessel into the cartridge chamber. When a cartridge 37 is exploded, the pressurized gas unseats the valve 36 permitting the flow of pressurized gas through the inlet 34 into the storage vessel 30. The spring then closes valve 36 to entrap the gas within the storage vessel.

Upon entering the storage vessel 30 the gas flow changes direction to discharge through an ash extractor filter 38 into the outlet fitting 35. The outlet fitting connects to a pressure line 39 which conducts the gas to the hydraulic and electrical units of the power supply. A demand valve is ordinarily attached to this line (as illustrated by valve 21 in FIG. 1) and is adapted to provide gas to the drive units of the power supply only when required for the operation thereof. A small portion of the gas is also introduced into a Bourdon pressure gage 32. This gage comprises a Bourdon tube 40 contacting the actuating arm 41 of a microswitch 42. The Bourdon tube 40 is adapted to increase in curvature in proportion to the decrease of pressure in the storage vessel, thus actuating the switch through arm 41. The position of the microswitch 42 relative to the Bourdon tube is therefore determinative of the pressure at which the switch is actuated. This position may be varied by means of an adjusting screw 43. In this way the gage may be adapted to close the switch at a pressure within the storage vessel equal to a predetermined operating minimum. The closing of the switch 42 provides electrical energy through output leads 44. These output leads connect the input leads 45 at the triggering mechanism 33 which is adapted to explode one of the cartridges 37. The gas resulting from this explosion increases the pressure within the storage tank thus decreasing the Bourdon tube curvature and opening the switch 42 in preparation for another firing.

The triggering mechanism 33 (FIG. 4) is adapted to fire a charge unit upon the reception of a command signal from the microswitch 42 of the pressure gage. To this end the input leads 45 are connected to a solenoid 46. Energization of the solenoid pulls in a core 47 which pulls in arm 48 thus drawing back hammer 49 against a spring. The hammer is then released, hitting firing pin 50 sharply to fire the cartridge 37.

In this embodiment the plurality of charge units is contained in the form of cartridges within a revolving cylinder 51. In order to arrange each cartridge into firing position and in position to expel gas into the storage vessel 30, the actuator arm 48 is adapted to rotate the cylinder 51 after each explosion. This is effected by means of a ratchet 52 and pawl 53 arrangement.

Other cartridge-containing embodiments may comprise automatic pistol, rifle, or belt-fed machine gun mechanisms, in place of the revolver type mechanism illustrated in FIG. 4. A pistol or rifle mechanism is more flexible in design than the revolver mechanism since the number of standard caliber cartridges in a clip or magazine may be easily varied in accordance with the power requirements of the missile.

In any of the embodiments, cartridge parameters which may be varied in accordance with the requirements of the missile are, the amount of gun powder in a cartridge, grain size, or burning characteristics. In addition, the number of charge units may be optimized for minimum gas generator weight. In this context, it should be noted that storage tank volume and weight decrease at the greatest rate as the number of shots increases from 3 to 9. Cartridge case and magazine weights increase rapidly as the number of rounds increases further. An optimum number of shots for minimum package weight therefore lies about the middle of the range from 5 to 15 shots.

The ability to vary the number of cartridges employed yields flexible generator design adaptable to various values of storage tank volume, flight time, tank pressure, number of command pulses, etc. For example if a storage tank is designed for a pressure of 20,000 p.s.i. and each cartridge charges the tank to only 10,000 p.s.i., the necessary compensation may be effected by increasing the number of cartridges employed. Thus a variable number of input charges may be employed to compensate for the parameter changes encountered in shifting from one missile to another. This makes the gas generator of the invention suitable for use in a wide variety of different applications relative to missile design and flight time merely by changing the number of cartridges in the magazine or clip and setting the pressure regulator before the launch or flight. It should be noted, however, that the least weight results from the use of a storage tank designed for a pressure equal to the pressure produced by the gas volume of a single cartridge. Operation at pressures below the tank pressure rating results in a weight penalty or increase over this optimum weight. Nevertheless the gas generator of this invention effects a weight saving of from 60 to 90 pounds over gas generators heretofore employed in guided missiles. It should also be noted that the improved generator increases in weight at a relatively small rate through a large range of increase in missile flight time.

Another alternative charge unit arrangement comprises a plurality of fixed squibs individually mounted in separate chambers within a threaded plug which is fitted into the wall of the storage vessel 30. Each squib chamber has a machine wall thickness separating it from the interior of the storage vessel. This wall thickness is blown out by the firing of a squib to permit the entry of gas into the pump. An electrical circuit is provided which is connected to fire a squib upon the reception of a command signal from the pressure gage and to fire the plurality of squibs in a predetermined order. The squibs should be sufficiently separated from one another so that heat generated by the explosion of one squib does not ignite an adjacent squib.

Figure 5:
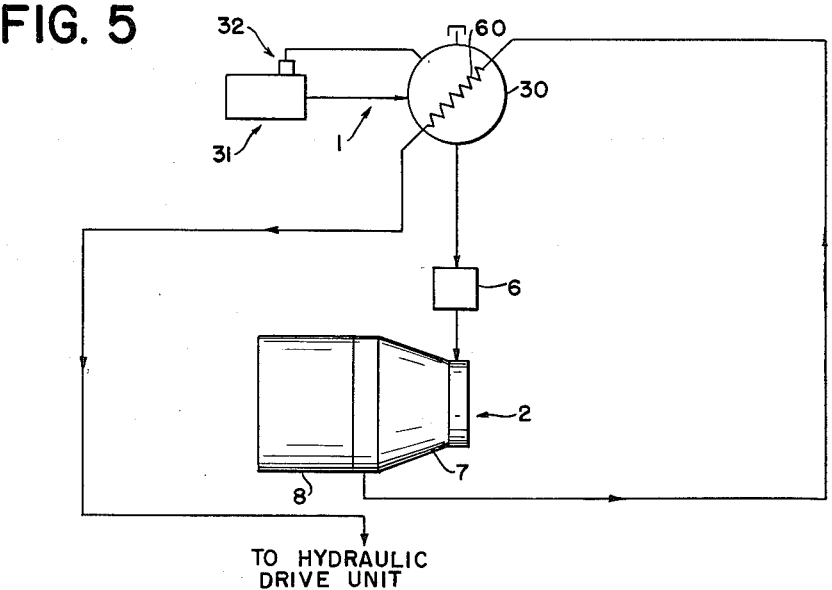
FIG. 5 is a schematic diagram showing cooling means associated with the gas generator of FIG. 2 as employed in the power supply auxiliary of the invention.

In employing the gas generator of FIGS. 2, 3, and 4 the hydraulic and electrical drive units may be connected in parallel as in FIG. 1 or in series as in FIG. 5. In either event, and as illustrated in FIG. 5, the exhaust gases from the alternator 8 may be cycled through a coil 60 arranged about the storage vessel 30 of the gas generator 1. This coil acts to cool the gas within the storage vessel 30 and to heat the exhaust gases in order to prevent freezing of the control valves. In the parallel arrangement illustrated in FIG. 1 the exhaust gases, after cooling the gas within the storage vessel 30, would be emptied into the atmosphere.

Figure 6:
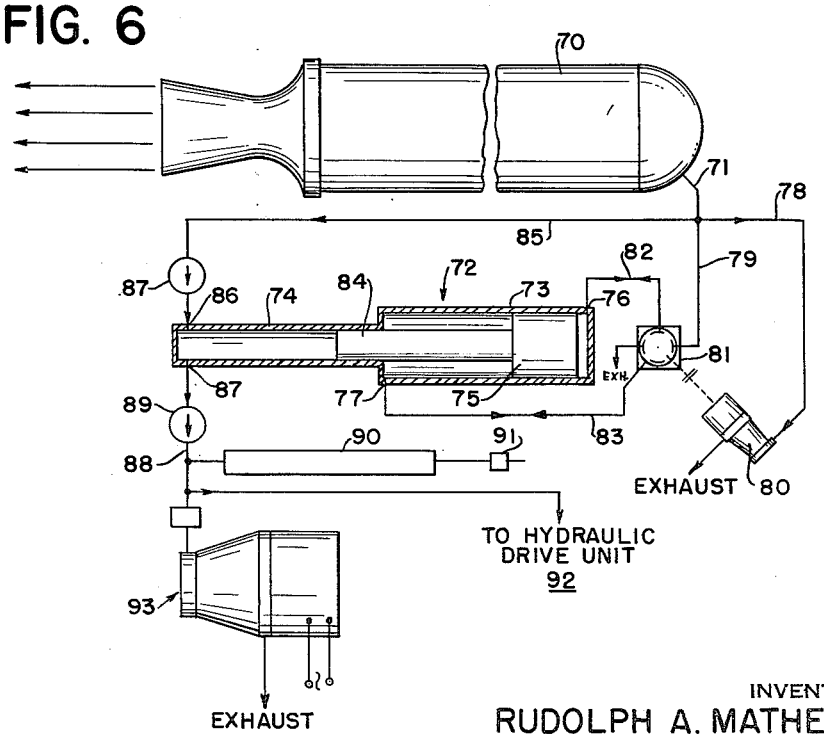
FIG. 6 is a view of an alternative embodiment of the gas generator employed in FIG. 1.

Another gas generator embodiment, employing energy generated by the propulsion motor of the missile, is illustrated in FIG. 6. Ordinarily missile propulsion is effected by means of a reaction motor 70 ejecting an elastic fluid from a generation chamber at some predetermined pressure and temperature and for a period of time usually less than the flight time of the missile. Heretofore this difference in "burning time" and missile flight time has been an obstacle to the employment of energy produced by the propulsion motor for operating the electrical and hydraulic units of the missile due to the requirement that these units be powered throughout the missile flight time. The gas generator provided by the invention is adapted to convert energy from a missile reaction motor into electrical and hydraulic power not only while the reaction motor is operative but also during the interval of time between motor "burn out" and target-strike.

The improved gas generator comprises conduit means 71 connected to the propulsion motor of the missile to abstract pressurized gas therefrom. This gas is normally at a pressure less than that required for the operation of the drive units of the missile. In order to raise the pressure up to the required value the invention provides a compressor engine 72. This engine is operable by a portion of the bled gas from propulsion motor 70 and adapted to compress another portion of such bled gas. To this end the engine is of the reciprocating type and comprises an operating cylinder 73 and a compression chamber 74. The operating cylinder 73 is provided with a reciprocating piston 75, and a pair of ports 76 and 77 arranged at opposite ends thereof. To operate the piston a portion of the bled gas abstracted through the conduit 71 is conducted into two tributary conduits 78 and 79. Tributary conduit 78 conducts gas into a gear turbine 80, the mechanical output of which is employed to drive the vanes of a rotary distribution valve 81. The distribution valve has an inlet port connected to tributary conduit 79, and a pair of outlet ports, one of which is connected through conduit 82 to port 76 at one extreme of the operating cylinder, and the other of which is connected through conduit 83 to port 77 at the other extreme of the operating cylinder. In this manner gas is alternately conducted through the valve 81 into one port and then into the other port to reciprocate the operating piston 75 within the operating cylinder 73.

The compression chamber 74 is provided with a compressor piston 84 which is linked to the operating piston 75. Thus the compressor piston 84 reciprocates within the compresor chamber 74 in response to the drive provided by the operating piston 75. The conduit 71 conducts a portion of the bled gas into another tributary 85 which is connected to an inlet port 86 within the compression chamber. A check valve 87 is provided in tributary 85 to entrap the gas within the compression chamber 74. Thus when the operating piston 75 drives the compressor piston 84 within the compression chamber, the entrapped gas is compressed to a predetermined higher pressure. This pressurized gas is then conducted out of the compressor chamber through an outlet port 87 by means of a conduit 88 having a check valve 89 for preventing the re-entry of pressurized gas into the compression chamber.

In order to provide a continuously available supply of pressurized gas to the drive units of the missile, the improved gas generator includes an accumulator tank 90 adapted to store the pressurized gas output of the compressor engine. A safety valve 91 is advantageously connected to the accumulator to control the pressure therewithin. The conduit means 88 then leads from the gas accumulator 90 to the drive units 92 and 93 of the missile. Exhaust gas from the turbo alternator 93 may be employed prior to its discharge into the atmosphere to cool the compressed gas input and/or output to the compressor chamber. The exhaust of the gear turbine 80 may also be employed for this purpose.

The size and weight of the interim accumulator tank 90 is proportional to the difference between the missile flight time and the motor burning time. Ordinarily the motor burning time is in a range of 50 percent to 80 percent of the missile flight time. Thus the accumulator may be called upon to supply enough gas to power the drive units for half of the total missile flight time.

The bled gas type of gas generator above described may only be used with missiles employing propulsion motors of the pressurized gas reaction type. Within such a missile it provides pressurized gas at the optimum pressure required, throughout the missile flight time, and with the use of relatively small and lightweight components. In addition, such a gas generator can be stored for a considerable period of time without appreciable loss of effectiveness so that upon ignition it very quickly meets the maximum power demands of the missile.

Preferred embodiments of the invention have been described. Various changes and modifications may be made in the scope of the invention as set forth in the appended claims.

I claim:
1. A power supply auxiliary system for the control equipment of an airborne guided missile comprising a reservoir of substantially inelastic fluid, a demand vessel, a generator of pressurized gas, a fluid injector operable by pressurized gas from said generator and connected to pump increments of substantially inelastic fluid from said reservoir into said demand vessel, said demand vessel being adapted to maintain the pressure of the substantially inelastic fluid pumped therein above a predetermined minimum, an actuator unit for driving the said control equipment and operable by pressurized substantially inelastic fluid, conduit means connected to introduce pressurized substantially inelastic fluid from said demand vessel to said actuator unit for the operation thereof, and a demand valve connected in said conduit means and adapted to permit fluid flow therethrough in response to the operating requirements of said actuator unit.

2. A power supply auxiliary system in accordance with claim 1 in which the said demand vessel includes a riser chamber containing a pressurized elastic fluid and formed by a diaphragm separating the substantially inelastic fluid within said demand vessel therefrom, the pressurized elastic fluid within said riser chamber causing the said diaphragm to maintain the pressure of the substantially inelastic fluid within the said demand vessel above the said predetermined minimum.

3. A power supply auxiliary system driving control equipment within an airborne guided missile, comprising a reservoir of substantially inelastic fluid, a demand vessel, a generator of pressurized gaseous fluid, a fluid injector operable by pressurized gaseous fluid and connected to pump increments of substantially inelastic fluid from said reservoir into said demand vessel, said demand vessel being adapted to maintain the pressure of the substantially inelastic fluid pumped therein above a predetermined minimum, first conduit means connected to introduce pressurized gaseous fluid from said generator to said fluid injector for the operation thereof, an actuator unit for driving the said missile control equipment and operable by pressurized substantially inelastic fluid, second conduit means connected to introduce pressurized substantially inelastic fluid from said demand vessel to said actuator unit for the operation thereof, and first and second demand valve means connected to said first and second conduit means respectively, and adapted to permit fluid flow therethrough in response to the operating requirements of said actuator unit.

4. A power supply auxiliary system for control equipment within an airborne guided missile, comprising a vessel adapted to store pressurized gas, a gage for measuring the gas pressure within said storage vessel and adapted to produce a command signal when the gas pressure therewithin decreases to a predetermined minimum, means for maintaining the gas pressure within said storage vessel above said predetermined minimum, comprising a plurality of gas-producing explosive charge units, trigger means responsive to command signals from said pressure gage and adapted to fire a said charge unit in response to each said command signal and to fire the plurality of said charge units in a predetermined order, and means arranging each said charge unit in a position to explode gas into said storage vessel when fired by said trigger means, a drive unit for said control equipment operable by pressurized gas, conduit means connected to introduce gas from said storage vessel to said drive unit for the operation thereof, and a demand valve connected in said conduit means and adapted to permit gas flow therethrough in response to the operating requirements of said drive unit.

5. A power supply auxiliary system in accordance with claim 4 in which the said pressure gage includes an electrical circuit, a switch having a movable arm and connected to produce an electrical command signal within said circuit in response to the position of its said arm, said pressure gage being adapted to vary the position of said arm in response to pressure variations within said storage vessel, and means for adjusting the said arm to produce a command signal at a predetermined gas pressure within said storage vessel.

6. A power supply auxiliary system in accordance with claim 5 in which the said trigger means includes an electrical solenoid connected within the said pressure gage electrical circuit, a movable core for said solenoid operable by a said command signal produced by said electrical circuit, and means for firing a said explosive charge unit in response to the movement of said core by a said command signal.

7. A power supply auxiliary system for control equipment within an airborne guided missile comprising a vessel adapted to store pressurized gas, a gage for measuring the gas pressure within said storage vessel and adapted to produce a command signal when the gas pressure therewithin decreases to a predetermined minimum, means for maintaining the gas pressure within said storage vessel above said predetermined minimum, comprising a plurality of gas-producing explosive charge units, trigger means responsive to command signals from said pressure gage and adapted to fire a said charge unit in response to each said command signal and to fire the plurality of said charge units in a predetermined order, and means arranging each said charge unit in a position to explode gas into said storage vessel when fired by said trigger means, a reservoir of substantially inelastic fluid, a demand vessel, a fluid injector operable by pressurized gas and connected to pump increments of substantially inelastic fluid from said reservoir into said demand vessel, said demand vessel being adapted to maintain the pressure of the substantially inelastic fluid pumped therein above a predetermined minimum, first conduit means connected to introduce gas from said storage vessel to said fluid injector for the operation thereof, an actuator unit for driving the said control equipment and operable by pressurized substantially inelastic fluid, second conduit means connected to introduce pressurized substantially inelastic fluid from said demand vessel to said actuator unit for the operation thereof, and a demand valve connected in said second conduit means and adapted to permit fluid flow therethrough in response to the operating requirements of said actuator unit.

8. A power supply auxiliary system in accordance with claim 7 which further comprises a demand valve connected in said first conduit means and adapted to permit gas flow therethrough in response to the operating requirements of said actuator unit.

References Cited in the file of this patent

UNITED STATES PATENTS

| | | |
|---|---|---|
| 53,758 | Gros | Apr. 3, 1866 |
| 2,723,528 | Stark | Nov. 15, 1955 |
| 2,733,689 | Badenoch | Feb. 7, 1956 |
| 2,740,259 | Westlund | Apr. 3, 1956 |
| 2,865,168 | Zillman | Dec. 23, 1958 |